W. G. WILSON.
STUFFING BOX.
APPLICATION FILED FEB. 9, 1918.
1,321,965.
Patented Nov. 18, 1919.
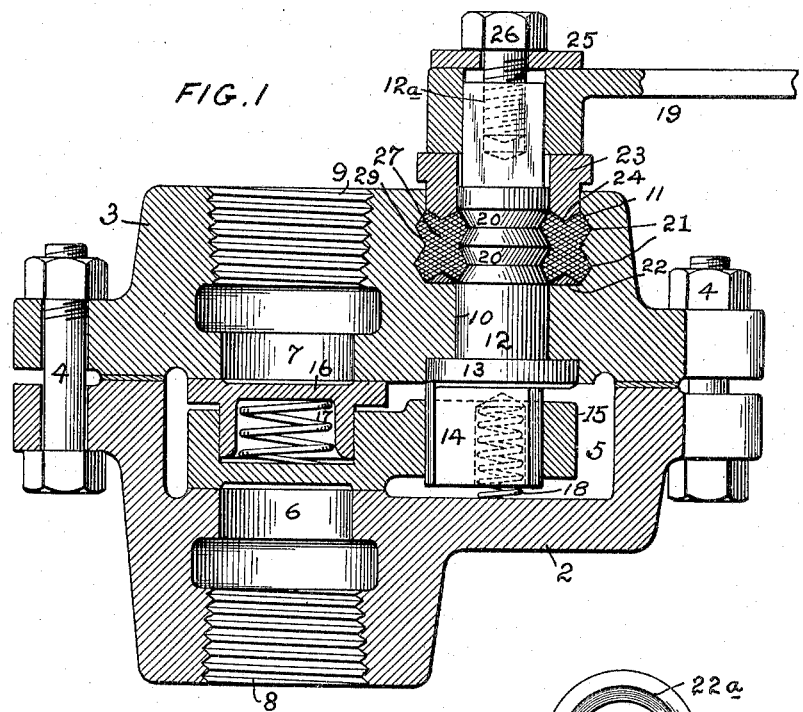
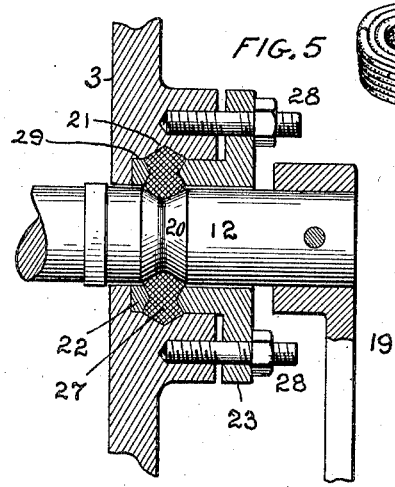
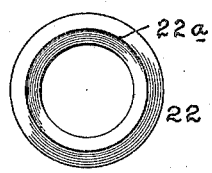
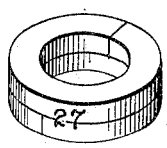
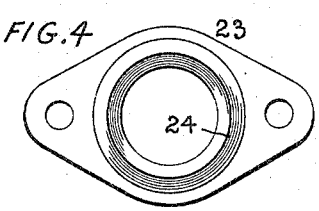
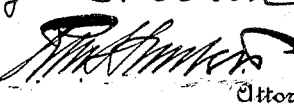

UNITED STATES PATENT OFFICE.

WYLIE GEMMEL WILSON, OF ELIZABETH, NEW JERSEY.

STUFFING-BOX.

1,321,965.     Specification of Letters Patent.     Patented Nov. 18, 1919.

Application filed February 9, 1918. Serial No. 216,203.

*To all whom it may concern:*

Be it known that I, WYLIE GEMMEL WILSON, a subject of the King of Great Britain, and resident of Elizabeth, county of Union, and State of New Jersey, have invented an Improvement in Stuffing-Boxes, of which the following is a specification.

My invention has for an object an improvement in shaft packing, more especially adapted to quick-acting valves employing a rock shaft as a means of operating the same, the special feature of advantage to be secured by my improvement residing in so shaping the walls of the confining space for the packing and the surface of the rocking spindle that a tight packed joint is easily insured and at the same time a greater surface area is packed with a given cross section of packing than heretofore obtainable, with the result that the sealing of the rocking spindle against the passage of steam or other fluid is more perfectly insured.

More particularly, my invention has for its object the provision in the metallic confining surfaces for the packing such configuration as will cause the packing to more readily change its shape laterally when subjected to compression and fit closely to the confining surfaces in a more perfect and satisfactory manner than has heretofore been possible with packing and stuffing-boxes in which the lateral walls were parallel.

A further object of my invention is to provide a construction in which a relatively short stuffing-box may be employed with an efficient sealing of the shaft; and moreover, my improved packing is designed to insure a tight joint even where the shaft is somewhat loose in its bearing such as to permit slight longitudinal motion or oscillatory motion of its axis, a condition which with ordinary packing it is almost impossible to make fluid tight.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings:—Figure 1 is a sectional view of a quick-acting valve showing my improved packing applied thereto; Fig. 2 is a plan view of the bottom gland of the packing box; Fig. 3 is a perspective view of a ring of packing material adapted for use in my improved packing box; Fig. 4 is the stuffing-box gland; and Fig. 5 is a sectional view of a modification of the packing means shown in Fig. 1.

While my invention is broadly directed to packing for shafts, it has also special application to packing of rocking spindles for quick-acting valves, and by way of example I have illustrated in Fig. 1 a common form of such valves now in general use with my improvements applied thereto. 2 and 3 are the two portions of the casing or body of the valve and these are bolted together by bolts 4. The part 2 is provided with an inlet port 6 having a screw-threaded hub 8 for receiving the pipe connections, and the part 3 of the casing is provided with an outlet port 7 having a screw-threaded hub 9 for receiving the discharge pipe. 12 is a rocking spindle extending through a bearing 10 in the part 3 of the casing and has its outer end 12$^a$ made square and fitted with a lever 19 by which it may be rocked. The inner end of the rocking spindle 12 may be provided with an annular flange 13 fitting against the inner surface of the casing part 3 and having a hub 14 which carries the swinging arm 15 within the valve chamber 5 of the casing. The swinging arm 15 is guided over the guide surface within the part 2 of the casing and about the inlet port 6 thereof. 16 is a valve piece which is in contact with the guide surface on the inner face of the part 3 of the casing surrounding the outlet port 7 thereof, and the valve piece 16 is journaled in the free end of the arm 15 and is spring-pressed upon its seat, the spring 17 for this purpose being confined within an inclosed chamber and pressing at one end upon the valve piece 16 and at the other end upon the swinging arm so that each of these parts is spring-pressed upon its respective seat. The spindle 12 may be pressed longitudinally by a coil spring 18 to seat the annular collar 13 upon its seating surface in the part 3 of the casing.

Referring more particularly to the packing box structure employed in connection with the valve casing and rocking spindle above described, the spindle itself is provided with two annular grooves 20 preferably of V-shape and relatively shallow as to their width. The casing 3 surrounding the grooved portions of the spindle is provided with the stuffing-box chamber 29 and the side wall thereof is provided with one or more annular grooves 21 preferably of substantially the shape of the grooves 20 but directed oppositely thereto; that is to say, the bottoms of the grooves 20 and 21 are a greater distance apart than are the remaining portions of the spindle and side wall of the packing chamber. Preferably, the grooves 20 and 21 are the same in number and are also preferably symmetrically disposed, as shown, for the more effective action upon the packing. Seated in the bottom of the packing chamber 29 is the bottom gland 22 which is in the form of an annular washer of more or less V-shaped cross section so that its upper surface presents an annular V-shaped ridge 22ª upon which the packing rests. The position of this bottom gland 22 is such that it will be below the annular grooves 20 of the rocking spindle. Surrounding the spindle and fitting the entrance to the packing chamber 29 is the outer gland 23. This gland has a cylindrical outer surface as is customary in stuffing-boxes and snugly fits a cylindrical portion of the packing chamber, but its inner end provides an annular conical ridge 24 similar to that of the annular bottom gland or washer 22 and opposed to it, as will be clearly understood by reference to Fig. 1. This gland 23 may be forced down upon any suitable packing 27 within the packing chamber 29 by the employment of screw studs and nuts 28, as shown in Fig. 5; or in a special construction as adapted to the valve of Fig. 1, the gland may be adjusted by means of a cap screw 26 and a washer 25 pressing upon the hub of the operating lever 19 as shown. In this construction, the hub of the lever 19 presses upon the gland 23 and the cap screw is screwed into the end of the spindle 12, and acting through the washer 25 will move the hub of the lever to a greater or less extent downward upon the gland 23. In this manner the gland may be forced down upon the packing 27. If the shaft were required to extend to a considerable distance through the gland, it is manifest that this particular construction for holding it in place and adjusting it could not be conveniently employed. It is also evident that in addition to the devices just described in connection with Fig. 1, the screw studs and nuts shown in Fig. 5 may also be employed, as the uniform adjustment may be accomplished by the cap screw 26 and then the nuts and studs 28 employed for holding the gland in adjusted position and removing the strain upon the collar 13 to allow the spindle to work more freely. It will also be understood that where there is no collar 13 employed in the rocking shaft or spindle, then and in that event it would not be convenient to apply the pressure to the gland by means of the cap screw 26, because in doing so there would be longitudinal strain upon the shaft which would put undue strain upon the packing where it extends into the annular grooves 20. These variations in adjusting the gland may be adapted to the particular uses to which the packing device is applied, and I do not restrict myself in this respect.

It will now be understood that if the packing in the form of Figs. 3 or 6 is dropped into the packing chamber 29 and then the gland 23 inserted and pressure applied as above explained, the result will be to drive the annular ridge portions 22ª and 24 respectively into the top and bottom of the packing. This action tends to not only compress the packing, but to cause it to expand laterally to fill the grooves 20 and 21 so that it takes on a cross sectional shape or more or less X-form. It will be seen that in this manner there is a positive lateral displacement of the packing and at the same time the inclined annular walls on each side of the ridge 24 act to press the packing toward the inclined annular ridges of the grooved portions 20 and 21 which directly oppose them, and thus insure a tight compression of the packing not only by lateral displacement but by direct pressure from the gland down to the supporting inclined walls of the spindle and of the packing chamber. If we consider the action of the gland 23 upon the lower portion of the packing immediately above the bottom gland 22, it will be seen that the packing in this case will be forced to the right and left over the ridge 22ª and likewise upon the inclined walls of the grooves 20 and 21, thereby again securing the pressure upon the spindle and insuring a tight packing. Aside from this action of squeezing the packing between an inclined surface of the gland and an inclined surface of the spindle, there is an increased length of surface of the spindle against which the packing contacts, and consequently this increased surface also aids in insuring a perfect seal. Not only is this aided by the length of the surface so presented, but it is also aided by the fact that the surface is made up of a plurality of portions at an angle to each other which necessitates the zig-zagging of the fluid and its consequent entrainment which insure a non-leaking joint.

There is another point of view as to the tightness of a packing which may be stated as follows: Assuming that there is a high fluid pressure and that there is some leaking along the shaft toward the packing. The action of this pressure outward will tend to force the packing outward against the gland 23 and in doing so will also force it against the inclined surfaces of the grooves, and this is facilitated by the fact that the annular ridge portion 24 of the gland acts to spread the packing against the inclined opposing annular surfaces of the shaft and packing chamber or box; and moreover, it is evident that the higher the fluid pressure the more tightly will the packing be compressed, and therefore at all times there will be insured a most efficient seal.

When the packing wears, it is only necessary to loosen and pull back the gland 23 and insert more packing just as an ordinary stuffing-box is packed. Where there is to be a considerable depth of packing, a plurality of rings 27 may be employed, but I do not in any manner restrict myself to the character of the packing employed, as almost any packing may be made to shape itself under the pressure of the gland to fill the grooves in the manner illustrated and described. It will also be understood that even after the shaft or spindle has been worn and has more or less looseness, the packing will insure a tight joint and will be automatic in maintaining such tight joint while at the same time permitting reasonable flexibility in the movement of the shaft.

In Fig. 5, I have illustrated my improvement with only one groove 20 in the shaft and one groove 21 in the stuffing-box, as an alternative to the employment of two grooves as in Fig. 1. The general principle of construction and operation is the same and construction shown in Fig. 5 would be especially adapted to cases where very shallow stuffing-boxes alone were permissible from lack of space. Reversely, it is evident that more than two grooves on the shaft and in the box may be employed if so desired; and it is further to be understood that while I prefer a symmetrical cross section to be followed both on the shaft and on the wall of the box, nevertheless this is not essential, and I do not restrict myself to this identity in configuration of the two parts. It is also manifest that the bottom gland or washer 22 might be dispensed with, if so desired.

This invention is applicable to packing rocking or rotating shafts for various uses as well as for rocking spindles with or without collars and irrespective of whether the shaft or spindle is journaled in a close fitting bearing or sufficiently free to be journaled practically in the packing itself. This latter condition is illustrated in Fig. 5, in which there may be considerable oscillation to the shaft or spindle while maintaining its journaled relation to the packing itself in which it is directly supported. In fact, in many cases it is good practice to make all the metallic parts of the stuffing-box, which surrounds the shaft, of an exceedingly loose fit relatively to the shaft, so that the shaft itself actually contacts only with the packing and not at all with the metal of the stuffing-box or gland. Stuffing-boxes without metallic bearings for direct contact with the shaft and employing my improved packing, are suitable for various classes of machines, such for example, as centrifugal pumps, auto-gear cases, and rotary steam engines of either the positive pressure, the impulse or the reaction types.

The nature of the means employed for causing the packing to assume the shapes shown and adapt itself to the grooved walls of the stuffing-box and shaft, will insure a snug fitting of the packing with less pressure than is necessary where the gland operates upon packing in an annular space with cylindrical bounding walls, as heretofore, and notwithstanding this lesser pressure the tightness of the packed joint is increased. This increase in tightness is not only caused by the increased surface length due to the grooved construction of the shaft and box, but more especially because the pressure of the steam or other fluid presses the packing against the surface provided by the grooves; that is to say, a pressure outward upon the inner end of the packing 27, causes its inclined annular surfaces to press against the opposing inclined annular surfaces of the grooves in the box and shaft. The packing being of a yielding nature, it adapts itself to the inclined surfaces of the box and shaft grooves; and the greater the fluid pressure, the greater is the pressure of the packing upon the surfaces and hence the tighter the seal. In this manner, my improved packing accomplishes results not attainable with packing as ordinarily employed about smooth shafts and cylindrical walled boxes. So effective is my improved packing, that after screwing down the gland 23 to spread the packing into the grooves of the shaft and box, the gland may be loosened by turning back the nuts of the gland studs 28 nearly a full turn, and thereafter a fluid pressure, even as great as 200 pounds per square inch, will fail to cause any appreciable leakage.

While the packing illustrated in Fig. 3, by way of example, may be employed, I prefer ordinary small rope or cord-like strand packing which may be employed by wrapping it, severing it at each wrapping about the shaft, and in quantity sufficient to fill the box; and in practice I have found excellent results to be secured by use of asbestos rope packing. The packing that would preferably be used would be packing in the form of a small rope or cord, the diameter of the cord being considerably less than the space between the shaft and the wall of the stuffing-box. A piece of such cord long enough to go around the shaft, say once, would be cut off and put in, then another similar piece put in with its joint around 90° from the joint of the first piece; then another piece with its joint around 90° again, and so on, breaking joints each time until a sufficient number of pieces had been dropped in to fill one groove as illustrated in Fig. 5. The packing thus inserted would be squeezed home at intervals until the stuffing-box was full. This simulates the ordinary practical method of packing a stuffing-box, using ordinary commercial packing of the kind which will fit any size stuffing-box and does not require that special packing of a specific size shall be purchased for each specific stuffing-box. I do not, however, restrict myself to any particular form or type of packing, except that it must be pliable and capable of being spread laterally by pressure applied by the gland 23.

In addition to its practicability and ease of application, this method of packing the box would actually give better results than any other type of packing that could be used, on account of the entire absence of continuous seams or joints in the packing structure.

This multiplicity of small cords of packing with broken joints would, by the pressure of the gland, be squeezed into a mass which for all practical purposes would be one piece and jointless. Further, the structure of the packing consisting of a number of circles, free to expand or contract, lying upon one another, would permit complete spreading of the packing, or contraction of the packing, into the grooves on the outer wall of the stuffing box and the grooves on the stem, with the minimum pressure applied by the gland.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A stuffing-box comprising a casing provided with annular grooves on its interior walls, a shaft extending through the casing and provided with corresponding circumferential grooves, suitable flexible fibrous packing yieldingly filling the annular space between the shaft and the grooved wall of the casing, and adjustable means to compress said packing in a direction substantially parallel to the shaft to cause it to spread laterally and yieldingly fill the grooves of both the casing and the shaft and be retained therein.

2. A stuffing-box comprising a case provided with annular grooves, a shaft adapted to rotate in said casing and provided with grooves in transverse alinement with the grooves in the casing, suitable flexible fibrous packing interposed between shaft and casing and filling the space in the box and grooves, and means to compress said packing in a direction substantially parallel to the shaft to cause it to spread laterally and yieldingly fill the grooved portions.

3. In a stuffing-box for shafts and spindles consisting of a bearing having a stuffing-box at one end, the wall of which is provided with a V-shaped annular groove, combined with a shaft journaled in the bearing and extending through the stuffing-box said shaft being provided with a V-shaped annular groove in the same transverse alinement with the V-shaped groove in the stuffing-box, packing arranged in the stuffing-box, an inner gland portion fitting the bottom of the stuffing-box and surrounding the shaft and presenting an outwardly directed annular ridge of V-shaped cross section, an adjustable outer gland portion fitting about the shaft and having its inner end provided with an annular ridge of V-shaped cross section, and means to adjust the outer gland to put the packing under compression and cause it to spread laterally into the grooved portions.

4. In a stuffing-box for shafts and spindles, the combination of a bearing having at one end a stuffing-box, the outer wall of which is provided with a plurality of annular grooves of V-shaped cross section, with a shaft journaled in the bearing and provided with a plurality of annular grooves of V-shaped cross section arranged in the same transverse alinement with the grooves in the stuffing-box, packing arranged in the stuffing-box between the grooved portions of the box and shaft, an annular gland fitting the stuffing-box and shaft, and means to adjust the gland to apply adjustable pressure to the packing and cause it to spread laterally into the grooved portions of the box and shaft.

5. In a stuffing-box for shafts and spindles, the combination of a bearing having at one end a stuffing-box, the outer wall of which is provided with a plurality of annular grooves of V-shaped cross section, with a shaft journaled in the bearing and provided with a plurality of annular grooves of V-shaped cross section arranged in the same transverse alinement with the grooves in the stuffing-box, packing arranged in the stuffing-box between the grooved portions of the box and shaft, an annular bottom gland having an outwardly directed annular ridge of V-shaped cross section, an annular gland fitting the stuffing-box and shaft and having its under side provided with an annular ridge of V-shaped cross section, and means to adjust the gland to supply pressure to the packing and cause it to spread laterally into the grooved portions of the box and shaft.

6. In a stuffing-box construction, the combination of a bearing having a stuffing-box at one end the outer wall of which is provided with an annular groove of V-shaped cross section, a shaft journaled in the bearing and provided with a flange fitting to the end of the bearing most distant from the stuffing-box and said shaft also provided with an annular V-shaped groove arranged in transverse alinement with the groove in the stuffing-box, packing in the stuffing-box, a gland surrounding the shaft at the open end of the stuffing-box and having its inner end provided with an annular ridge of V-shaped cross section pressing upon the packing to spread it laterally into the grooved portions of the box and shaft, and means secured to the end of the shaft for applying pressure upon the stuffing-box said means also holding the collar of the shaft against the end wall of the bearing.

7. In a stuffing-box for shafts and spindles, consisting of a bearing having a stuffing-box at one end, combined with a shaft journaled in the bearing and extending through the stuffing-box said shaft being provided with a V-shaped annular groove, packing arranged in the stuffing-box, an inner gland portion fitting the bottom of the stuffing-box and surrounding the shaft and presenting an outwardly directed annular ridge of V-shaped cross section, an adjustable outer gland portion fitting about the shaft and having its inner end provided with an annular ridge of V-shaped cross section, and means to adjust the outer gland to put the packing under compression and cause it to spread laterally into the grooved portions.

8. A stuffing-box for shafts and spindles the outer wall of which is annularly grooved, combined with a shaft having its part which extends through the stuffing-box also annularly grooved, a packing in the stuffing-box, and a gland fitted about the shaft portion and extending into the stuffing-box for applying adjustable pressure upon the packing and causing it to spread laterally into the annular grooves of the box or shaft.

9. A stuffing-box for shafts and spindles, consisting of a bearing having at one end thereof a stuffing-box the outer wall of which is annularly grooved, combined with a shaft portion journaled in the bearing and having its part which extends through the stuffing-box provided with an annular groove, a packing in the stuffing-box, an annular bottom gland arranged in the bottom of the stuffing-box and presenting an outwardly directed annular ridge portion, and an annular outer gland fitting about the shaft portion and extending into the stuffing-box said gland portion having an annular conical ridge portion on its inner end.

10. A stuffing-box for shafts and spindles, consisting of a bearing having a stuffing-box at one end, the wall of which is provided with a V-shaped annular groove, combined with a shaft journaled in the bearing and extending through the stuffing-box said shaft being provided with a V-shaped annular groove in the same transverse alinement with the V-shaped groove in the stuffing-box, packing arranged in the stuffing-box, an adjustable gland portion fitting about the shaft and having its inner end provided with an annular ridge of V-shaped cross section, and means to adjust the gland to put the packing under compression and cause it to spread laterally into the grooved portions.

In testimony of which invention, I hereunto set my hand.

WYLIE GEMMEL WILSON.

Witnesses:
WM. F. MADILL,
ESTHER GOODE.